INVENTOR.
JAMES M. BOOE
ATTORNEY

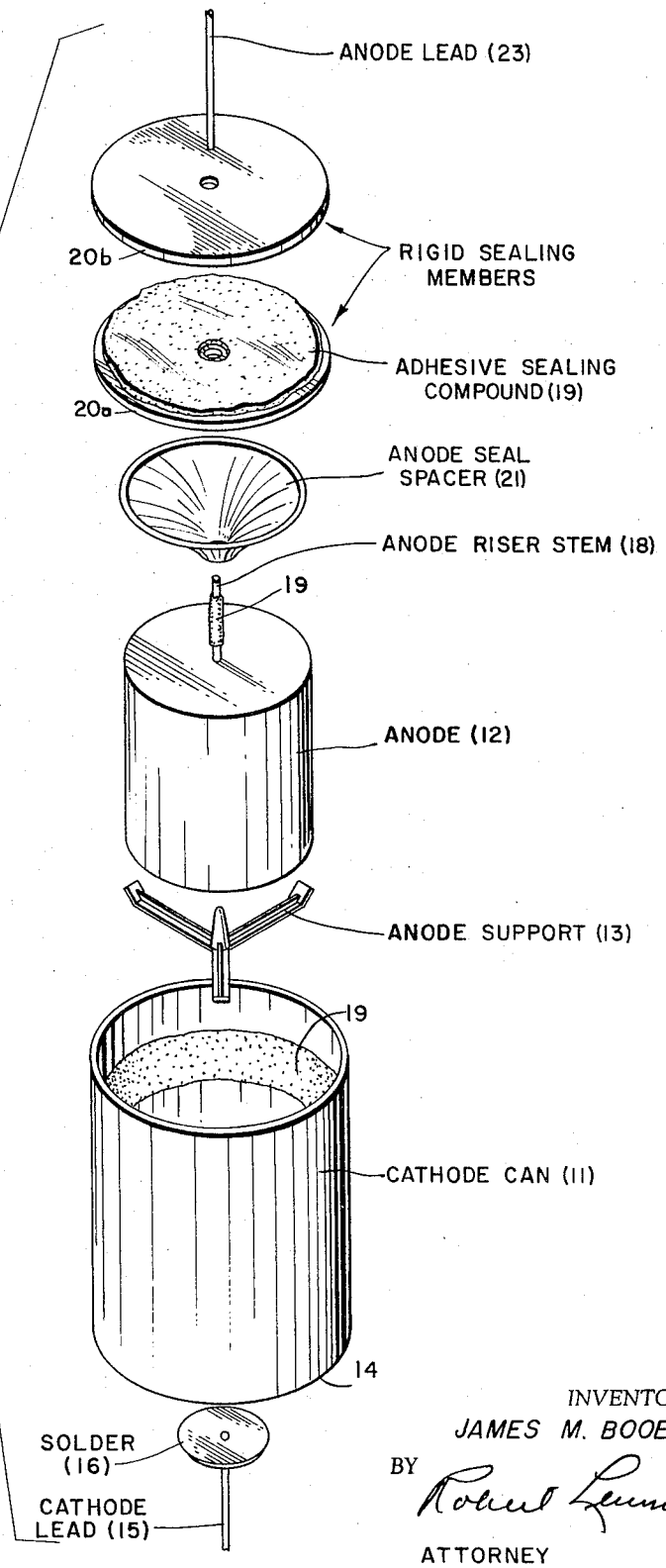

United States Patent Office 3,300,692
Patented Jan. 24, 1967

3,300,692
SEAL STRUCTURE IN ELECTROLYTIC DEVICE INCLUDING DISC-MEMBERS AND ANODE SPACER
James M. Booe, Indianapolis, Ind., assignor to P. R. Mallory & Co., Inc., Indianapolis, Ind., a corporation of Delaware
Filed May 5, 1964, Ser. No. 365,002
9 Claims. (Cl. 317—230)

This invention relates to a seal construction for electrolytic capacitors, and is specifically directed to means and methods for using same, particularly in tantalum and niobium capacitors having liquid or gelled electrolytes.

Most failures of devices of this nature are attributed to the inability of the device to compensate for electrolyte and vapor expansion during temperature cycling. These devices employ thick plug seals which rest on the anode, the electrolyte level extending to the base of the plug. Such devices attempt to compensate for the electrolyte and vapor expansion by utilizing somewhat elastic sealing plug members. However, most failures occur at the seals and such failures are both catastrophic and gradual. In catastrophic failures, the unit ruptures suddenly at the seal, allowing the electrolyte to flow or be blown from the device. Gradual failures usually take place by one or both of two modes: (1) The bond between the insulator and metal members is of such inadequacy that moisture vapor from the electrolyte permeates this juncture allowing the electrolyte to dry out. (2) Electrolyte gradually exudes or creeps from the device between the insulator seal and the metal members, thus eventually depleting the cell of electrolyte and causing complete electrical failure or an intolerable shift in its electrical properties. Additionally, since the electrolyte may be highly corrosive, as an acid, damage to adjacent equipment may result.

It is an object of this invention to provide means for eliminating electrolyte contamination in areas where a bond is to be achieved between the sealing member and the metal electrodes.

It is an object of this invention to provide means of compensating for movement of parts and expansion of electrolyte and vapor during temperature cycling.

It is an object of this invention to provide means whereby the sealing construction cannot be readily pushed from the cell by internal pressure created during operation.

It is an object of this invention to provide a rigid anode-seal spacer construction for electrical devices, particularly miniature electrolytic capacitors, which provides a void space between the electrolyte and seal to accommodate electrolyte and vapor expansion during temperature cycling.

It is an object of this invention to provide near maximum electrical properties with no increase in size or sacrifice of miniaturization of the device.

It is another object of this invention to provide an effective and long lasting seal to be used in conjunction with the anode-seal spacer which avoids the disadvantages of prior seals.

Other objects and advantages of the present invention will become apparent from the following description, taken in conjunction with the accompanying drawings in which:

FIGURE 3 is an exploded view of the assembly.

Generally speaking, the invention describes a funnel inverted bell, or T shaped anode-seal spacer of the same material as the anode. The spacer provides sufficient support for the sealing members so that a much thinner member may be employed, thus leaving a void between the electrolyte and seal to allow for expansion of electrolyte and vapors during temperature cycling. Fortunately, spacers made of the refractory metals tantalum and niobium occupy a minimum of volume in the void space. This is because of their high strength and particularly in the case of tantalum, its high density.

The sealing device consists of two somewhat rigid disc-like plastic members 20 and an inert elastomeric adhesive compound 19 which has 3 functions: (1) Bonding to the metal electrode members; (2) offering resiliency to compensate for movement of the other members as a result of temperature changes; and (3) preventing electrolyte creepage over the metal surfaces to the exterior of the device and minimizing loss of water vapor from the electrolyte. An optional member of the sealing device is a casting resin 22 having a high bond strength to metals. One form of the invention is shown in the figures although there are various modifications of same.

Figure 1:
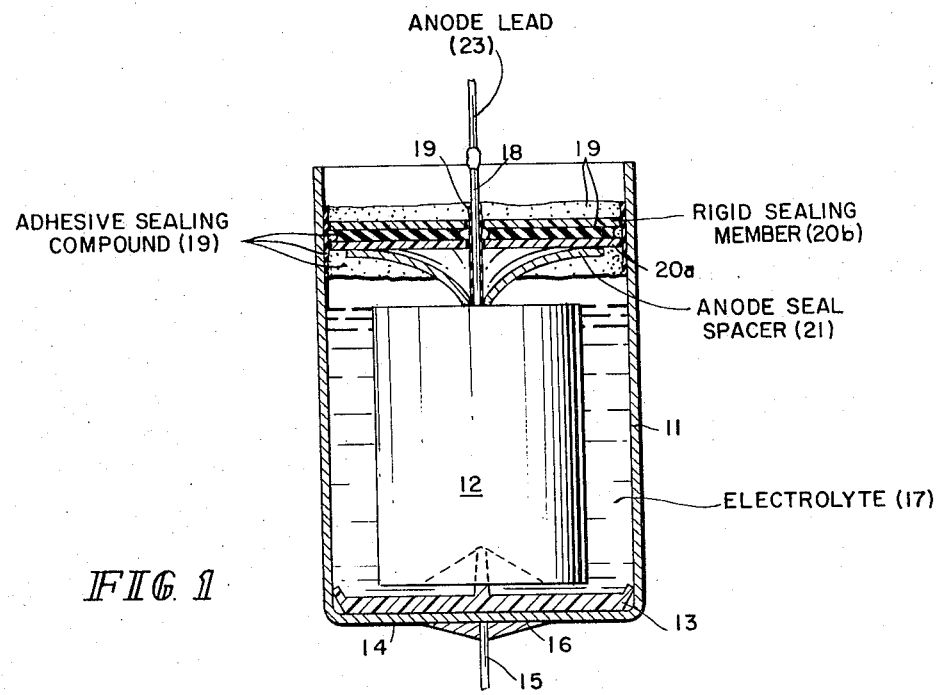
FIGURE 1 is a vertical, sectional view of an electrolytic capacitor embodying the invention prior to compressing the sealing members.

Referring now to FIGURE 1 of the drawings which illustrates an embodiment of the invention there is shown an electrolytic capacitor generally designated by reference number 10. Said capacitor 10 has a silver cathode can 11 containing a porous tantalum anode 12.

The tantalum anode 12 is both positioned and secured in the cathode can 11. This positioning and securing preferably results in a construction in which the anode 12 is centered and in which the anode 12 will not twist or rotate and will also be supported against shock. To achieve this result, the anode support 13 constitutes a plastic triangular shaped stamping having a centrally located anode contacting prong as described in Mallory owned U.S. Patent No. 2,758,259, issued Aug. 7, 1956.

At the bottom wall 14 of cathode can 11 there is positioned a cathode lead 15 secured by preformed solder 16.

Between anode 12 and its associated cathode 11 there is interposed an electrolyte 17 which may be in the free-flowing condition or in the immobilized form and containing a suitable depolarizing material to prevent gas formation during operation as a result of electrolytic action. In the immobilized form, a gelling agent may be used in the electrolyte 17 which is not adversely affected by the electrolyte 17, for example silica gel.

Anode 12 has connected thereto a stem or riser 18 which is fabricated of the same material as the anode 12 and integrally formed therewith. Adhesive 19 is applied to anode riser 18 from anode 12 to a point above the level of location of the top plastic member 20b. The funnel-shaped anode spacer 21 is positioned so that it circumscribes anode riser 18 and rests on the anode 12. Adhesive 19 is applied in a banded area to the cathode can 11 between the electrolyte level and the top of member 20b. A rigid acid resistant plastic member 20a (such as Kel–F or Teflon) is placed so that it circumscribes the anode riser 18 and rests on the anode-seal spacer 21. A layer of adhesive 19 is applied in a ring to plastic member 20a and another rigid plastic member 20b which also circumscribes anode riser 18 is placed thereupon. A tinned-nickel wire 23 is welded to anode riser 18.

One of the features of this invention is to provide a void space 23 between the electrolyte and the seal to allow for expansion of electrolyte and vapor during temperature cycling. This is accomplished by using a thin (approximately 0.005 inch thick) funnel-shaped or T shaped metal anode-seal spacer 21. The spacer also provides a high strength support for the plastic sealing members 20a and 20b thereby eliminating the need for the thick plug utilized in prior art, thus contributing to miniaturization of the device as well as improving its characteristics.

Another feature of the invention is to inhibit or prevent wetting of the sealing surface, particularly the metal surfaces, tantalum and silver, in their sealing areas during construction. This is partially accomplished by the void between the electrolyte and the sealing area. However, this is insured by utilizing an elastomeric adhesive material which has the property of producing water and electrolyte repellant areas where applied to metal surfaces. This material also fills in minute voids in the sealing structure to inhibit the ingress of electrolyte in such voids. It is necessary to select adhesive materials which will not react with electrolytes such as $H_2SO_4$ and which are tacky or adhesive in nature.

One such material is polyisobutylene. There are several grades of this material and one may be selected having the desired resistance to flow at elevated temperatures yet lending to forming in place.

It is known in the art to position a solid plastic plug centrally circumscribed by an elastomeric gasket which circumscribes the anode riser directly on the anode and to crimp at a point on the cathode can which corresponds to the center of the plug. As the electrolyte may be in contact with the plug, and as there has not been provided room for electrolyte and vapor expansion, seal failures are not uncommon. Further upon construction of such devices contact between the seal and electrolyte often result in wetting of the metal surfaces during sealing, thus producing an ineffective seal.

This invention forms a superior seal over prior art. The adhesive is applied at three points: (1) Circumscribing anode riser 18 from points of contact with anode 12 to point of contact with top rigid plastic member 20b; (2) between rigid plastic members 20a and 20b; (3) in a banded area on the inside of the cathode can 11 at a point of contact with sealing members. When the plastic members are compressed, the adhesive flows to all points insuring a superior seal. Furthermore, the void between the electrolyte and the seal eliminates the possibility of "wet seal" formation during construction.

Other materials also having properties of producing water or electrolyte repellant areas when applied to surface of the metals may be used in place of polyisobutylene. Composition indicated for this application should possess some or all of the following properties:

(1) Production of electrolyte repellant surface
(2) Ease of application
(3) Suitable degree of adhesion
(4) Withstand a broad temperature range (−55°−125° C.) without flowing
(5) High dielectric strength
(6) Inert to various electrolytes
(7) Low permeability to water vapor.

The rigid top members 20 may be one of the fluorinated plastics such as Teflon or Kel-F, preferably treated to enable bonding with the elastomeric adhesive material. For increased strength and rigidity top member 20b may be a glass reinforced plastic such as epoxy resin.

Figure 2:
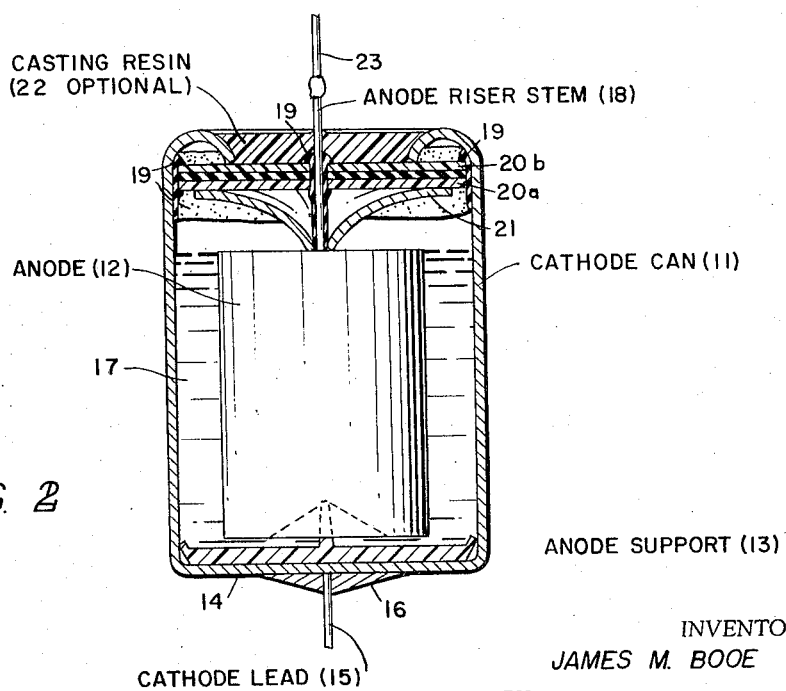
FIGURE 2 is a similar view of the capacitor shown in FIGURE 1 after complete assembly.

FIGURE 2 is another view of capacitor 10 differing only in the completion of the seal construction consisting of the adhesive material 19, the rigid plastic members 20a and 20b and the casting resin. With the rigid plastic members 20a and 20b in contact with the adhesive film 19 on the cathode can 11 and between members 20a and 20b, pressure is applied to top member 20b, preferably with a heated tool to fuse the adhesive between members 20a and 20b sufficiently to allow it to be forced radially and axially through the aperture 23 through which the anode riser 18 protrudes and around the outer periphery 24 of the top member 20b so as to bond with the adhesive coating 19c on the cathode can 11 wall. While the top member 20b is held in place, another tool turns the top edge of can 11 inward and downward such as to hold the rigid top members the anode-top spacer, the anode and its support in compression against the bottom of can 11. The casting resin 22 is then applied to the cavity and allowed to harden. Since the anode riser stem 18 is maintained in a clean condition in this area, good bonding of the casting resin 22 with these members is assured. The casting resin 22 is preferably of the epoxy type although not limited to aforesaid material. The application of a casting resin is optional and serves mainly to support the anode lead wire, however, the capacitor does not suffer without it.

FIGURE 3 is an exploded view of cathode 10 and will be described in conjunction with details of assembly so that the relationship of the various members will be clear.

Thoroughly clean the silver cathode can 11 (which may be silver or any other applicable metal) so that there is no trace of oil film on the surface. Solder cathode lead wire 15 to can 11. Insert anode support and locator 13 in the bottom of the can. Apply adhesive 19 to anode riser stem 18 from anode 12 to a point above the level of location of the rigid laminated top member 20a and 20b. This is preferably done at elevated temperature to insure the bond. Apply the anode top spacer member 21. Apply adhesive 19 in a banded area on the inside of the cathode can 11 from a point where the level of the electrolyte would be to a point slightly above the rigid top member 20b. Apply the rigid top member or members 20a and 20b to anode riser stem 18. One prelaminated member having the adhesive may be used, but if two separate members 20a and 20b are used apply a ring of adhesive 19 between the two but away from 11 edges.

Add electrolyte (in FIGURES 1 and 2) containing silver sulfate if cathode can 11 is silver to the container to a point where the top of the anode 12 will be. The depolarizer must be present to such an extent that the electrolyte ($H_2SO_4$) will be saturated and with a considerable excess, according to the teachings of Mallory owned U.S. Patents 2,778,979 and 2,710,369. Insert the anode 12 carefully into the cathode can 11 so as not to disturb the thin coating of adhesive and to allow ample time for the anode 12 to absorb the electrolyte.

With the rigid top members 20a and 20b now in contact with the adhesive film 19 on the can, apply pressure to the member, preferably with a heated tool, to fuse the adhesive between the two members 20a and 20b to allow it to be forced radially to and axially through the aperture through which anode riser 18 protrudes to combine with the coating thereon and around the outer periphery of the top member 20b so as to bond with and combine with the coating 19 on the can 11 wall. While the top member 20b is held in place, another tool turns the top edge of the can 11 inward and downward such as to hold the rigid top members 20a and 20b in place. Weld anode lead wire 23 to a solderable wire such as tinned nickel. Apply to anode riser 18 casting resin 23 (FIGURE 2) to the cavity and allow to harden.

The salient features of this invention are as follows:

(1) Provides a void between electrolyte and seal to allow for electrolyte and vapor expansion during temperature cycling thus minimizing pressure on the seal.

(2) Provides elimination of electrolyte contamination in areas where a bond is to be achieved with the metals (avoids "wet" seals).

(3) Eliminates electrolyte creepage or loss by capillary action.

(4) Minimizes loss of water vapor from the electrolyte.

(5) Provides compensation for movement of parts through temperature excursion.

(6) Provides means whereby the sealing construction cannot be readily pushed from the cell by internal pressure because of the confinement of the seal provided by the turned-in top edge of the cathode can.

This invention may be applied to tantalum and niobium capacitors in general. It may also apply to zirconium, titanium and aluminium devices. This construction is further characterized as lending itself to miniature sizes, although not restricted to such.

Although the above embodiment represents one aspect of the invention, certain variations may be practiced without departing from the scope of the invention. For example, only one rigid top member may be used, in which case said member may or may not be laminated. Such modification in the specific embodiments described above will be readily apparent to those skilled in the art. I consider all of these variations and modifications to be within the foregoing description and defined by the appended claims.

I claim:

1. A seal for electrolytic capacitors comprising: an open ended container and an electrolyte therein, an anode immersed in the electrolyte, a terminal riser extending from the anode, two rigid disc-like plastic members with apertures therein positioned within the open end of the container and circumscribing said anode riser, a funnel-shaped anode-seal spacer disposed between the anode and plastic members, providing a void between said electrolyte and said members, an inert adhesive sealing material filling the space between said plastic members, around said anode riser and said apertures, and a coating of said sealing material on the interior annular surface of said container in the area coinciding with the normal axial position of said plastic members, said sealing material around the anode riser, between the plastic members and on said annular surface forming a unitary body of said material, and means located on the end portion of the container for securing said plastic members in the end thereof.

2. A seal for electrolytic capacitors comprising: an open ended container and an electrolyte therein, an anode immersed in the electrolyte, a terminal riser extending from the anode, two rigid disc-like plastic members with apertures therein positioned within the open end of the container and circumscribing said anode riser, a curved funnel-shaped anode-seal spacer disposed between the anode and plastic members, providing a void between said electrolyte and said members, the smaller diameter end of said spacer adjacent said anode and the larger diameter end of said spacer adjacent said plastic members, an inert adhesive sealing material filling the space between said plastic members, around said anode riser and said apertures, and a coating of said sealing material on the interior annular surface of said container in the area coinciding with the normal axial position of said plastic members, said sealing material around the anode riser, between the plastic members and on said annular surface forming a unitary body of said material, and means located on the end portion of the container for securing said plastic members in the end thereof.

3. A seal for electrolytic capacitors comprising: an open ended container and an electrolyte therein, an anode immersed in the electrolyte, a terminal riser extending from the anode, two rigid disc-like plastic members with apertures therein positioned within the open end of the container and circumscribing said anode riser, a curved funnel-shaped anode-seal spacer disposed between the anode and plastic members, providing a void between said electrolyte and said members, the periphery of the smaller diameter end of said spacer means abutting said anode and the periphery of the larger diameter end abutting said plastic members, an inert adhesive sealing material filling the space between said plastic members, around said anode riser and said apertures, and a coating of said sealing material on the interior annular surface of said container in the area coinciding with the normal axial position of said plastic members, said sealing material around the anode riser, between the plastic members and on said annular surface forming a unitary body of said material, and means located on the end portion of the container for securing said plastic members in the end thereof.

4. A seal for electrolytic capacitors comprising: an open ended container and an electrolyte therein, an anode immersed in the electrolyte, a terminal riser extending from the anode, two rigid disc-like plastic members with apertures therein positioned within the open end of the container and circumscribing said anode riser, a curved funnel-shaped anode-seal spacer disposed between the anode and plastic members, providing a void between said electrolyte and said members, the periphery of the smaller diameter end of said spacer means abutting said anode and the periphery of the larger diameter end abutting said plastic members, an inert adhesive sealing material filling the space between said plastic members, around said anode riser and said apertures, and a coating of said sealing material on the interior annular surface of said container in the area coinciding with the normal axial position of said plastic members, said sealing material around the anode riser, between the plastic members and on said annular surface forming a unitary body of said material, crimped means located on the end portion of the container for securing said plastic members in the end thereof, and means reinforcing said seal located in the recessed area of said can as determined by said crimped means and said plastic members.

5. An electrolytic capacitor comprising a metal cathode can, said can having an integral closed end and an opposite open end, an inert anode support member within said can at said closed end, a film-forming refractory metal anode positioned on said support member, an electrolyte in said can with said anode immersed therein, a funnel-shaped anode-seal spacer composed of the same metal as said anode and positioned with an end adjacent thereto, the top surface of said electrolyte and the upper periphery of said spacer defining a void space within the can, a seal in the open end of said can comprising two rigid, disc-like plastic members with apertures therethrough and an anode terminal riser connected to said anode and extending through said apertures, said plastic members being positioned flatwise above and adjacent said anode-seal spacer, an inert adhesive sealing material interposed between said plastic members and around the anode riser at an area coinciding with the normal axial position of said plastic members, and a coating of said sealing material disposed on the interior annular surface of said can in the area coinciding with the normal axial position of said disc-like plastic members, said inert sealing material between the plastic members, around the anode riser and on the surface of the can forming a unitary body of said material, and a top edge portion of the can being crimped over into engagement with the outermost one of said plastic members securing the seal in the end of the can.

6. An electrolytic capacitor comprising a metal cathode can, said can having an integral closed end and an opposite open end, an inert anode support member within said can at said closed end, a film-forming refractory metal anode positioned on said support member, an electrolyte in said can with said anode immersed therein, a curved funnel-shaped anode-seal spacer composed of the same metal as said anode and positioned with the smaller diameter end adjacent thereto, the top surface of said electrolyte and the upper periphery of said spacer defining a void space within the can, a seal in the open end of said can comprising two rigid, disc-like plastic members with apertures therethrough and an anode terminal riser connected to said anode and extending through said apertures, said plastic members being positioned flatwise above and adjacent the larger diameter end of said anode-seal spacer, an inert adhesive sealing material interposed between said plastic members and around the anode riser at an area coinciding with the normal axial position of said plastic members, and a coating of said sealing material disposed on the interior annular surface of said can in the area coinciding with the normal axial position of said disc-like plastic members, said inert sealing material between the plastic members, around the anode riser and on the surface of the can forming a unitary body of said material, and a top edge portion of the can being crimped over into engagement with the outermost one of said plastic members securing the seal in the end of the can.

7. An electrolytic capacitor comprising a metal cathode can, said can having an integral closed end and an opposite open end, an inert anode support member within said can at said closed end, a film-forming refractory metal anode positioned on said support member, an electrolyte in said can with said anode immersed therein, a curved funnel-shaped anode-seal spacer composed of the same metal as said anode and positioned with the periphery of the smaller diameter end abutting the end of said anode, the top surface of said electrolyte and the upper periphery of said spacer defining a void space within the can, a seal in the open end of said can comprising two rigid, disc-like plastic members with apertures therethrough and an anode terminal riser connected to said anode and extending through said apertures, said plastic members being positioned flatwise above and abutting the periphery of the larger diameter end of said anode-seal spacer, an inert adhesive sealing material interposed between said plastic members and around the anode riser at an area coinciding with the normal axial position of said plastic members, and a coating of said sealing material disposed on the interior annular surface of said can in the area coinciding with the normal axial position of said disc-like plastic members, said inert sealing material between the plastic members, around the anode riser and on the surface of the can forming a unitary body of said material, and a top edge portion of the can being crimped over into engagement with the outermost one of said plastic members securing the seal in the end of the can.

8. An electrolytic capacitor comprising a cathode can of metal selected from the group consisting of copper and silver, said can having an integral closed end and an opposite open end, an inert anode support member within said can at said closed end, a film-forming refractory metal anode positioned on said support member, an electrolyte in said can with said anode immersed therein, a curved funnel-shaped anode-seal spacer composed of the same metal as said anode and positioned with the periphery of the smaller diameter end abutting the end of said anode, the top surface of said electrolyte and the upper periphery of said spacer defining a void space within the can, a seal in the open end of said can comprising two rigid, disc-like plastic member with apertures therethrough and an anode terminal riser connected to said anode and extending through said apertures, said plastic members being positioned flatwise above and abutting the periphery of the larger diameter end of said anode-seal spacer, an inert adhesive sealing material interposed between said plastic members and around the anode riser at an area coinciding with the normal axial position of said plastic members, and a coating of said sealing material disposed on the interior annular surface of said can in the area coinciding with the normal axial position of said disc-like plastic members, said inert sealing material between the plastic members, around the anode riser and on the surface of the can forming a unitary body of said material, and a top edge portion of the can being crimped over into engagement with the outermost one of said plastic members securing the seal in the end of the can.

9. An electrolytic capacitor comprising a cathode can of metal selected from the group consisting of copper and silver, said can having an integral closed end and an opposite open end, an inert anode support member within said can at said closed end, a film-forming refractory metal anode selected from the group consisting of tantalum and niobium positioned on said support member, an electrolyte in said can with said anode immersed therein, said electrolyte containing an excess amount of metal ions of said cathode metal, a curved funnel-shaped anode-seal spacer composed of the same metal as said anode and positioned with the periphery of the smaller diameter end abutting the end of said anode, the top surface of said electrolyte and the upper periphery of said spacer defining a void space within the can, a seal in the open end of said can comprising two rigid, disc-like plastic members with apertures therethrough and an anode terminal riser connected to said anode and extending through said apertures, said plastic members being positioned flatwise above and abutting the periphery of the larger diameter end of said anode-seal spacer, an inert adhesive sealing material interposed between said plastic members and around the anode riser at an area coinciding with the normal axial position of said plastic members, and a coating of said sealing material disposed on the interior annular surface of said can in the area coinciding with the normal axial position of said disc-like plastic members, said inert sealing material between the plastic members, around the anode riser and on the surface of the can forming a unitary body of said material, and a top edge portion of the can being crimped over into engagement with the outermost one of said plastic members securing the seal in the end of the can.

References Cited by the Examiner
UNITED STATES PATENTS

| 2,758,149 | 8/1956 | Brennan | 317—230 |
| 3,248,613 | 4/1966 | Griffin et al. | 317—230 |

JAMES D. KALLAM, *Primary Examiner.*